(12) United States Patent
Kamm et al.

(10) Patent No.: US 7,645,208 B2
(45) Date of Patent: Jan. 12, 2010

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 308 days.

(21) Appl. No.: 11/732,258

(22) Filed: Apr. 3, 2007

(65) Prior Publication Data

US 2008/0015074 A1 Jan. 17, 2008

(30) Foreign Application Priority Data

Apr. 6, 2006 (DE) .................. 10 2006 016 190

(51) Int. Cl.
*F16H 3/62* (2006.01)
(52) U.S. Cl. ..................................... 475/275
(58) Field of Classification Search .................. 475/275
See application file for complete search history.

(56) References Cited

U.S. PATENT DOCUMENTS

| 4,038,888 | A | * | 8/1977 | Murakami et al. | .......... 475/276 |
| 6,176,803 | B1 | | 1/2001 | Meyer et al. | |
| 6,634,980 | B1 | | 10/2003 | Ziemer | |
| 6,960,149 | B2 | | 11/2005 | Ziemer | |
| 7,014,589 | B2 | | 3/2006 | Stevenson | |
| 7,018,319 | B2 | | 3/2006 | Ziemer | |
| 7,204,780 | B2 | * | 4/2007 | Klemen | ....................... 475/279 |
| 7,285,069 | B2 | * | 10/2007 | Klemen | ....................... 475/275 |
| 7,311,635 | B2 | * | 12/2007 | Klemen | ....................... 475/286 |

FOREIGN PATENT DOCUMENTS

| DE | 42 34 572 A1 | 4/1994 |
| DE | 199 49 507 A1 | 4/2001 |
| DE | 100 83 202 T1 | 1/2002 |
| DE | 101 15 983 | 10/2002 |
| DE | 101 15 995 | 10/2002 |
| DE | 10 2004 029 952 A1 | 1/2005 |
| DE | 10 2005 002 337 | 8/2006 |
| DE | 10 2005 032 001 A1 | 2/2007 |

* cited by examiner

*Primary Examiner*—Ha D. Ho
(74) *Attorney, Agent, or Firm*—Davis & Bujold, P.L.L.C.

(57) ABSTRACT

The multi-speed transmission has rotatable shafts, planetary gearsets (RS1, RS2, RS3, RS4) and shifting elements (A, B, C, D, E). Carrier (ST4) of gearset (RS4) and the input shaft couple as shaft (1). Carriers (ST2, ST3) of respective gearsets (RS2, RS3) and the output shaft (AB) couple as shaft (2). Sun gears (SO1, SO4) of gearsets (RS1, RS4) couple as shaft (3). Carrier (ST1) of gearset (RS1) forms shaft (4). Sun gear (SO3) forms shaft (5). Ring gears (HO1, HO3) of gearsets (RS1, RS3) couple as shaft (6). Sun and ring gears (SO2, HO4) respectively of gearsets (RS2, RS4) couple as shaft (7). Carrier (ST2) is shaft (8). In the flow of power, elements (A, B) are respectively between shafts (3, 4) and a transmission housing; element (C) is between shafts (1, 5); element (D) is between shafts (6, 8); and element (E) is between shafts (5, 7).

32 Claims, 5 Drawing Sheets

Fig. 1

| GEAR | ENGAGED SHIFTING ELEMENTS | | | | | RATIO $i$ | STEP $\varphi$ |
|---|---|---|---|---|---|---|---|
| | BRAKE | | CLUTCH | | | | |
| | A | B | C | D | E | | |
| 1 | ● | ● | ● | | | 4.40 | |
| | | | | | | | 1.37 |
| 2 | ● | ● | | | ● | 3.21 | |
| | | | | | | | 1.44 |
| 3 | | ● | ● | | ● | 2.23 | |
| | | | | | | | 1.33 |
| 4 | | ● | | ● | ● | 1.68 | |
| | | | | | | | 1.29 |
| 5 | | ● | ● | ● | | 1.30 | |
| | | | | | | | 1.30 |
| 6 | | | ● | ● | ● | 1.00 | |
| | | | | | | | 1.16 |
| 7 | ● | | ● | ● | | 0.87 | |
| | | | | | | | 1.19 |
| 8 | ● | | | ● | ● | 0.73 | |
| | | | | | | | TOTAL |
| R | ● | ● | | ● | | −2.70 | 6.03 |

MULTI-SPEED TRANSMISSION

This application claims priority from German Application Serial No. 10 2006 016 190.4 filed Apr. 6, 2006.

FIELD OF THE INVENTION

The present invention concerns a multi-speed transmission of the planetary type, especially an automatic transmission for a motor vehicle, encompassing one input shaft, one output shaft, four planetary gearsets, at least eight rotatable shafts as well as five shifting elements, the selective engagement of which creates varied rotational speed ratios between the input shaft and the output shaft, to the end that eight forward gear stages and at least one reverse gear stage are made available.

BACKGROUND OF THE INVENTION

Automatic transmissions, especially for motor vehicles, include, in accord with the state of the technology of planetary gearsets and which are shifted by friction based shifting elements, such as clutches and brakes are customarily connected with a start-up element, which is augmented by a bypass clutch, which may be, for example, a hydrodynamically powered torque converter or a fluid clutch.

Within the framework of DE 101 15 983 A1 of the applicant, for example, a multi-speed transmission is described, having an input shaft which is bound to an input-sided gear set, and an output shaft, which is connected with an output-sided gear set, and has a maximum of seven shifting elements, the selective shifting of which, effectively shifts at least seven forward gears (without range shifting). The input-sided gear set is composed of a shiftable or a non-shiftable planetary gearset or, alternately, can be composed of two non-shiftable, mutually coupled planetary gearsets. The output-sided gear set is designed as a two carrier, four shaft transmission with two shiftable planetary gearsets and four free shafts. The first free shaft of this two-carrier, four shaft transmission is bound to the first shifting element, the second free shaft is connected to both the second and third shifting elements, the third free shaft engages the fourth and fifth shifting element and finally, the fourth free shaft is bound to the output shaft. In the case of a multi-speed transmission with a total of six shifting elements, in accord with the invention, the proposal can be made, to the effect that the third free shaft or the first free shaft can be bound additionally with a sixth shifting element. In the case of a multi-speed transmission with a total of seven shifting elements, in accord with the invention, the proposal can be made, that the third free shaft be bound additionally to a sixth shifting element and the first free shaft be additionally connected to a seventh shifting element.

A plurality of other multi-speed transmissions are, for example, also disengaged by DE 101 15 995 A1 of the applicant, wherein four shiftable, mutually coupled planetary gearsets and six or seven frictional shifting elements are provided, by the selective engagements of which, a speed of rotation of the input shaft of the transmission is to be transmitted to an output shaft of the same, so that nine or eleven forward gear stages and at least one reverse gear stage can be implemented. In accord with the therewith accompanying transmission diagram, in each gear two of three shifting elements are engaged, whereupon, a change from one gear to an immediately next higher successive gear, or to an immediately next lower gear, in order to avoid range shifting, respectively only one engaged shifting element need be disengaged and a previously disengaged shifting element can be disengaged.

Further in the generic, unpublished patent application DE 10 2005 0023 37.1 of the applicant, a multi-speed transmission is proposed with one input shaft, one output shaft, four mutually coupled single planetary gearsets and five shifting elements, whereby eight forward gear can be employed, these being free from range shifting, and shifted into in such a manner, that during one gear change from a forward gear into the next successive higher or lower forward gear, only one of the previously engaged shifting elements need be disengaged and only one of the previously disengaged shifting elements need be engaged. This known multi-speed transmission also possesses a reverse gear. In all forward gears as well as in the reverse gear, three shifting elements are engaged. Relative to the kinematical coupling of the four planetary gearsets among each other as well as to the shafts for input and output, provision has been made to the effect that: a carrier of the fourth planetary gearset is connected to the input shaft to form a first shaft of the transmission, a carrier of the third planetary gearset and the output shaft are bound together to form a second shaft of the transmission, a sun gear of the first planetary gearset and a sun gear of the fourth planetary gearset are connected together to form a third shaft of the transmission, an ring gear of the first planetary gearset forms a fourth shaft of the transmission, an ring gear of the second planetary gearset and a sun gear of the third planetary gearset are bound together to form a fifth shaft of the transmission, a carrier of the first planetary gearset and an ring gear of the third planetary gearset are bound together, to form a sixth shaft of the transmission, a sun gear of the second planetary gearset and an ring gear of the fourth planetary gearset are bound together to form a seventh shaft of the transmission and, finally, a carrier of the second planetary gearset forms an eighth shaft of the transmission. Relative to the kinematical coupling of the five shifting elements to the four planetary gearsets and to the shafts for input and output, provision has been made to the effect that: the first shifting element can be placed in the direction of the power-flow between the third shaft and the housing of the transmission, the second shifting element can be placed between the fourth shaft and the housing of the transmission, the third shifting element can be placed between the first and the fifth shafts, the fourth shifting element can be placed either between the eighth and the second shafts, or between the seventh and fifth shafts, or between the seventh and eighth shafts or between the fifth and eighth shafts.

Automatically shiftable vehicle transmissions, which are based on planetary gear arrangements, are generally of the currently accepted state of the technology, and consequently the subject of frequent descriptions and are subject to continual development and improvement. Accordingly, these transmissions should possess a sufficient number of forward gear stages as well as at least one reverse gear stage. Advantageously, these known transmissions should also have a very satisfactory ratio with a high degree of spread, as well as favorable steps between the gears. In addition, these transmissions enable a high startup and acceleration ratio in a forward gear and a have a direct gear for use in both passenger vehicles and trucks. Beyond this, these transmissions should be manufactured with small cost and little effort and require a minimal number of shifting elements and, where sequential shifting is required, should avoid double shifting, so that for shifting in defined gear-groups respectively, only one shifting element need be changed.

SUMMARY OF THE INVENTION

The present invention proposes a multi-speed transmission of the type mentioned in the introductory passages with at least eight shiftable forward gears (without range shifting) and at least one reverse gear, by means of which, under the usage of a total of four planetary gearsets, the least possible number of shifting elements are required. Additionally, the transmission is to have a large spread with simultaneously a harmonious gear succession and, at least in the main travel gears, a favorable degree of efficiency, and at the same time the transmission is to exhibit a negligible amount of slippage and tooth wear.

The inventive multi-speed transmission, is based on planetary operation, and has a background of the transmission diagram of the generic patent application DE 10 2005 002337.1 of the applicant and possesses one input shaft, one output shaft, four planetary gear sets, which are coupled together, at least eight rotational shafts as well as five shifting elements (namely two brakes and three clutches), the selective engagement of which activate predetermined speed of rotation ratios between the input shaft and the output shaft, so that eight forward gear stages and one reverse gear stage are realized. In each gear, respectively, three of the five shifting elements are engaged, for example, in case of change from one forward gear into a successively higher or lower forward gear, only one of the previously engaged shifting elements need be disengaged and only one of the previously close shifting elements need be engaged.

In accord with the invention, it is proposed, that:

a carrier of the fourth planetary gearset and the input shaft are continually bound together and form the first shaft of the transmission, an ring gear of the second planetary gearset, a carrier of the third planetary gearset and the output shaft are continually bound together and form the second shaft of the transmission, a sun gear of the first planetary gearset and a sun gear of the fourth planetary gearset are continually bound together and form the third shaft of the transmission, a carrier of the first planetary gearset forms the fourth shaft of the transmission, a sun gear of the third planetary gearset forms the fifth shaft of the transmission, an ring gear of the first planetary gearset and an ring gear of the third planetary gearset are continually bound together and form the sixth shaft of the transmission, a sun gear of the second planetary gearset and an ring gear of the fourth planetary gearset are continually bound together and form the seventh shaft of the transmission, a carrier of the second planetary gearset forms the eighth shaft of the transmission, the first shifting element is located in the power flow between the third shaft and the housing of the transmission, the second shifting element is located in the power flow between the fourth shaft and the housing of the transmission, the third shifting element is located in the power flow between the first and the fifth shafts of the transmission, the fourth shifting element is located in the power flow between the sixth and the eighth shafts of the transmission, and the fifth shifting element is located in the power flow between the fifth and the seventh shafts of the transmission.

The inventive multi-speed transmission differs from the generic DE 10 2005 0023 37.1 in that the second shaft of the transmission is now continually bound with the ring gear of the second planetary gearset, and the fourth shaft of the transmission is now formed by means of the carrier of the first planetary gearset, and the fifth shaft of the transmission is now formed by the sun gear of the third planetary gearset, and the sixth shaft of the transmission is now formed by the ring gear of the first planetary gearset and the ring gear of the third planetary gearset.

As with the case of the generic multi-speed transmission in accord with DE 10 2005 0023 37.1, it is also with the inventive multi-speed transmission, that the first forward gear is implemented by engagement of the first, second, and third shifting elements, the second forward gear stage, by engaging the first, second and fifth shifting elements, the third forward gear by engaging the second, third and fifth shifting elements, the fourth forward gear by engaging the second, fourth and fifth shifting elements, the fifth forward gear stage by engaging the second, third and fourth shifting elements, the sixth forward gear stage by engaging the third, fourth and fifth shifting elements, the seventh forward gear stage by engaging the first, third, and fourth shifting elements, the eighth forward gear stage by engaging the first, fourth and fifth shifting element and the reverse gear stage by engaging the first, second and fourth shifting elements.

Three of the four planetary gearsets are designed as the so-called negative planetary gearsets, the respective planet gears of which mesh with the corresponding sun and ring gears. One of the four planetary gearsets, that is to say, the first planetary gearset, is designed as a so-called positive planetary gearset, wherein the inner planet gears of the same mesh with the sun gear of this positive planetary gearset, and whereby the outer planet gears thereof also mesh with the ring gear of the same. Giving consideration to the spatial arrangement of the four planetary gearsets within the housing of the transmission, it is proposed to advantageously assemble the four planetary gearsets coaxially with respect to each other in a sequential order of the "first, fourth, second, third planetary gearset".

The spacial arrangement of the shifting elements of the inventive multi-speed transmission within the transmission housing is, principally, limited by the dimensions and the outer shape of the housing. A multitude of arrangements regarding the spatial positioning and constructive design of the shifting elements are, for example, disengaged by the generic patent application DE 10 2005 0023 37.1.

Thus it becomes possible to provide, with regard to the shifting element arrangement, favorable variants for a standard input drive, in that the first and the second shifting elements, space-wise, are placed, at least partially, in an area radially located above the first or fourth planetary gearsets, and the third, fourth and fifth shifting elements, with regard to spatial conditions, are placed at least partially in an area axially located between the fourth and second planetary gearsets. For example, in this arrangement, in an axial direction, the third shifting element directly borders the fourth planetary gearset, while the fourth shifting element, especially the disk set thereof is axially adjacent the second planetary gearset, whereby the fifth shifting element, with spatial limitations, can be at least partially located in an area axially disposed between the third shifting element and the disk of the fourth shifting element. The disk set of the fifth shifting element can, for example, and again, with regard to spatial limitations, be placed radially above the disk set of the third shifting element. Appearing as a favorable design concept for the third and the fifth shifting elements, a common disk carrier can be provided, which, in correspondence with the figure, is bound to the sun gear of the third planetary gearset. Again with spatial conditions, it is possible that the first and the second shifting elements be placed at least partially and axially next to one another or at least be arranged to be radially above one another.

By means of the inventive design of the multi-speed transmission, inherent gear ratios become available, especially for personal motor vehicles, which have a large total spread in a harmonic gear succession. Moreover, with the inventive multi-speed transmission, it is possible that with advantageously few shifting elements, namely two brakes and three clutches, time and expense for assembly thereof becomes relatively small. Additionally, there is an increase made available by the inventive multi-speed transmission, in the degree of efficiency in all gears, first, due to reduced slip losses, since in each gear stage, respectively, only two shifting elements are disengaged, and second, because of a much reduced loss of tooth wear in the economically constructed individual planetary gearsets.

Further, it is advantageously possible, with the inventive multi-speed transmission to carry out a startup with a hydrodynamic converter, or with an external startup clutch or even with other thereto adapted external startup elements. Consideration can also be given to the fact that the startup procedure can be advantageously enabled by means of a startup element integrated within the transmission. Advantageously, one of the two brakes can be adapted to this latter startup means, wherein the brake can be activated in both the first and second forward gear stage as well as in the reverse gear stage.

Additionally, the inventive multi-speed transmission is so designed, that it is possible to adjust the drive-train arrangements both in the power flow direction as well as in spatial installation conditions. Thus, without special design measures, it is possible to arrange the input and output shafts to be optionally either coaxial to one another or aligned in an axis-parallel manner.

In the design of an arrangement wherein input and output shafts run coaxially to one another, it is of value, if the first planetary gearset is that planetary gearset of the planetary gearset group, which is adjacent to the transmission input drive. In accord with the spatial arrangement of the five shifting elements within the transmission housing, provision can be made, that all four planetary gearsets can preferentially all be centrally and axially passed through by one shaft of the transmission. Thus, in connection with a shifting element arrangement, wherein the four planetary gearsets are coaxially arranged and placed in a "first, fourth, second, third" sequential order, the first and second shifting elements are located proximal to the input side in an area radially above the first or fourth planetary gearset, the third, fourth and fifth shifting elements, at least partially, are placed in an area axially located between the fourth and second planetary gearsets, the first and fourth planetary gearsets are centrally and axially passed through only by the first shaft of the transmission, while the second planetary gearset is centrally and axially passed through by the fifth shaft of the transmission and the third planetary gearset is not passed through in an axial direction by any shaft of the transmission. The means for pressure and lubrication to the servoapparatuses of the individual shifting elements is of a correspondingly simple design.

For an application wherein the input and output shafts are axis-parallel or at an angle to one another, it is possible that the first or the third planetary gearset be located on that side of the transmission housing, which is proximal the drive motor of the transmission, which is operationally connected to the input shaft. If the first planetary gearset is proximal to the input drive of the transmission, then, it is possible—as in the above coaxial arrangement of the input and output shafts—in accord with the spatial limitations of the arrangement of the five shifting elements within the transmission housing—that provision can be made such that all four planetary gearsets, respectively will be axially and centrally passed through by one shaft of the transmission. Further, the first and the fourth planetary gearsets are passed through by only the first shaft of the transmission and the second planetary gearset passed through by only the fifth shaft of the transmission.

If, in connection with non-coaxially arranged input and output shafts, on the other hand, the third planetary gearset is proximal to the input drive of the transmission, then the first and the fourth planetary gearset must not be passed through by a shaft of the transmission. Relative to the above mentioned arrangement of the third fourth and fifth shifting element, being axially located between the second and fourth planetary gearsets for example, the second planetary gearset is centrally passed through by both the fifth shaft of the transmission as well as by the first shaft of the transmission, which latter runs sectionally and centrally within this fifth shaft, while the third planetary gearset is centrally passed through in the axial direction only by the first shaft.

In all cases, it is possible that the third shaft of the transmission, which is formed sectionally by the sun gears of the first and fourth planetary gearsets, can be rotationally affixed on a hub, which hub, in turn, is affixed to the transmission housing. If the first planetary gearset is proximal to the input drive of the transmission, then this housing-affixed hub is a component of the input drive side of the transmission housing wall, otherwise, it is a component of the transmission housing wall opposite the drive motor of the transmission.

BRIEF DESCRIPTION OF THE DRAWINGS

In the following, the invention is described and explained in greater detail with the aid of the drawings. In the drawings the same components, or thereto comparative components are designated by the same reference numbers. There is shown in.

DETAILED DESCRIPTION OF THE INVENTION

Figure 1:
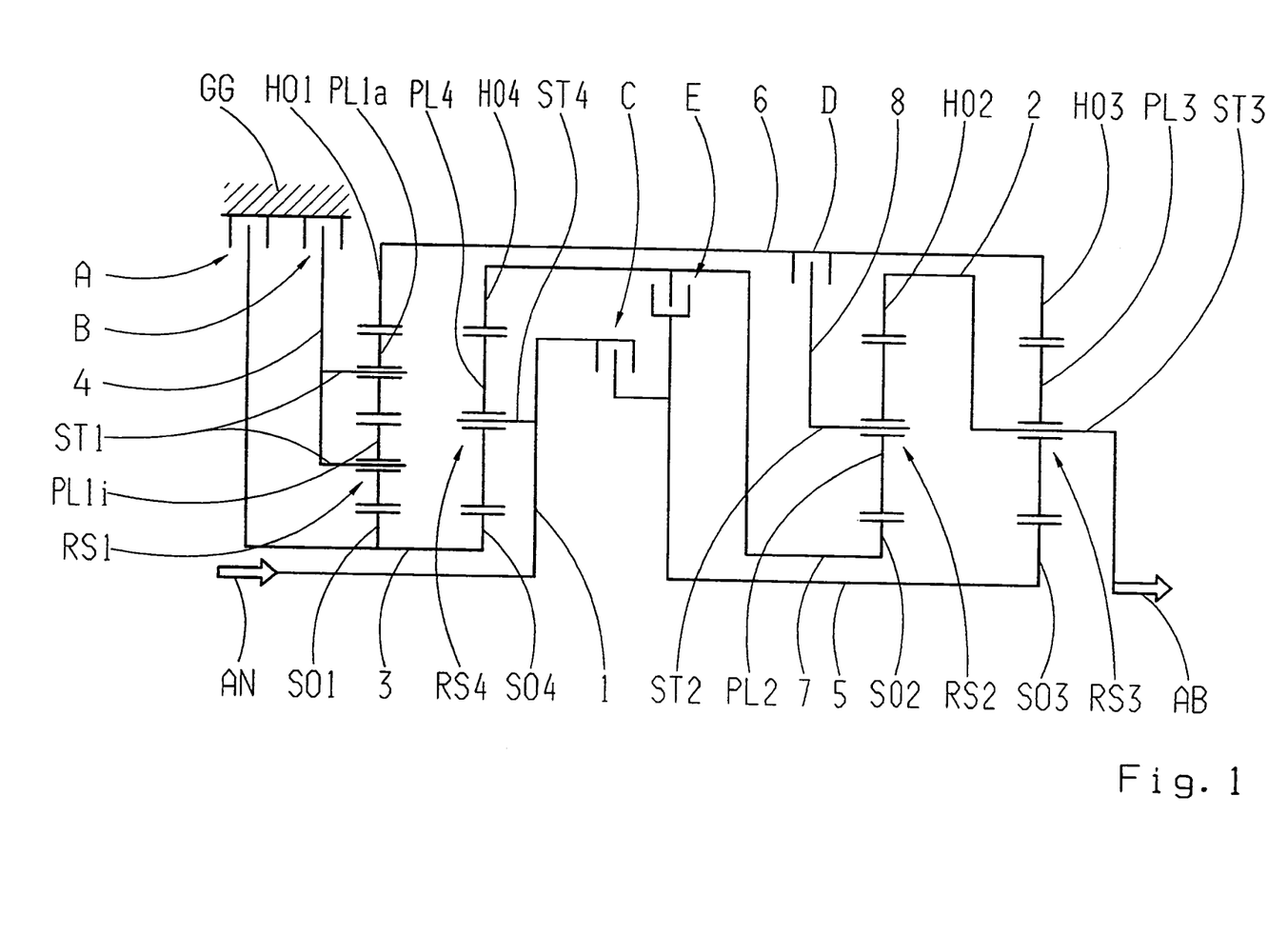
FIG. 1 a schematic illustration of an embodiment of a multi-speed transmission in accord with the invention.

FIG. 1 shows an embodiment example of an inventive multi-speed transmission in a schematic presentation. The transmission includes an input shaft AN and an output shaft AB, as well as four planetary gearsets RS1, RS2, RS3, RS4 and five shifting elements A, B, C, D, E, which are all engaged within one housing GG of the transmission. The four planetary gearsets RS1, RS2, RS3, RS4, in this embodiment example, are arranged, coaxially, one after the other in the sequential order of "RS1, RS4, RS2, RS3". The planetary gearsets RS2, RS3 and RS4 are designed as single negative planetary gearsets. A negative planetary gearset possesses, as is known, planet gears which mesh with the integral sun gear and ring gear of the respective planetary gearset. The ring gears of the planetary gearsets RS2, RS3, RS4 are designated with the reference numbers HO2, HO3 and HO4, the sun gears thereof with SO2, SO3 and SO4, the planet gears are shown as PL2, PL3 and PL4, and the carriers, on which the planetary gears are rotatably mounted, are designated respectively, ST2, ST3 and ST4. The planetary gearset RS1 is constructed as a single positive planetary gearset in a double-planetary assembly method. A positive planetary gearset possesses as is known, intermeshing inner and outer planet gears, whereby these inner planet gears also mesh with the sun gear of the this planetary gearset, and whereby these outer planet gears also mesh with the ring gear of this planetary gearset. The ring gear of the planetary gearset RS1 is designated as HO1, the sun gear as SO1, the inner planet gears as PL1$i$, the outer planet gears as PL1$a$, the carrier, on which the inner and outer planet gears PL1$i$, PL1$a$ are rotatably affixed, is designated as ST1. The shifting elements A and B are designed as brakes, which, in the present embodiment are constructed as frictional, shiftable, disk brakes. Obviously, in another embodiment, the described frictional, shiftable brakes can as well be installed as claw or wedge brakes. The shifting elements C, D and E are designed as clutches, which, in the presented example, are all frictional, shiftable disk clutches. Again, obviously, in another arrangement, these could be shape-fixed, shiftable dog or cone clutches. With these five shifting elements A to E, a selective shifting of eight forward gears and at least one reverse gear can be realized. The invented multi-speed transmission possesses, a total of at least eight rotational shafts, which shafts are individually designated by the reference numbers 1 through 8.

In regard to the kinematic coupling of the individual elements of the four planetary gearsets RS1, RS2, RS3, RS4 and the input and output shafts AN, AB, the following is provided: The carrier ST4 of the fourth planetary gearset RS4 and the input shaft AN are continually connected together and form the shaft 1. The ring gear HO2 of the second planetary gearset RS2, the carrier ST3 of the third planetary gearset RS3 and the output shaft AB are continually connected together and form the shaft 2. The sun gears SO1, SO4 of the first and the fourth planetary gearsets RS1, RS4 are continually connected together and form the shaft 3. The coupled carrier ST1 of the first planetary gearset RS1 forms the shaft 4. The sun gear SO3 of the third planetary gearset RS3 forms the shaft 5. The ring gear HO1 of the first planetary gearset RS1 and the ring gear HO3 of the third planetary gearset RS3 are continually bound together and form the shaft 6. The sun gear SO2 of the second planetary gearset RS2 and the ring gear HO4 of the fourth planetary gearset RS4 are continually bound together and form the shaft 7. The carrier ST2 of the second planetary gearset RS2 forms the shaft 8.

Considering now the kinematic coupling of the five shifting elements A to E to the so described shafts 1 to 8 of the transmission, the following is provided in the case of the multi-speed transmission in accord with FIG. 1: The brake A, serving as a first shifting element is placed in the power flow between the shaft 3 and the housing GG of the transmission. The brake B, serving as a second shifting element is placed in the path of the power flow between the shaft 4 and the housing GG of the transmission. The clutch C, which is the third shifting element is placed in the path of the power flow between the shaft 1 and the shaft 5. The clutch D, being the fourth shifting element is placed in the path of the power flow between the shaft 6 and the shaft 8. The clutch E, serving as fifth shifting element is placed in the path of the power flow between the shaft 5 and the shaft 7.

Figure 13:
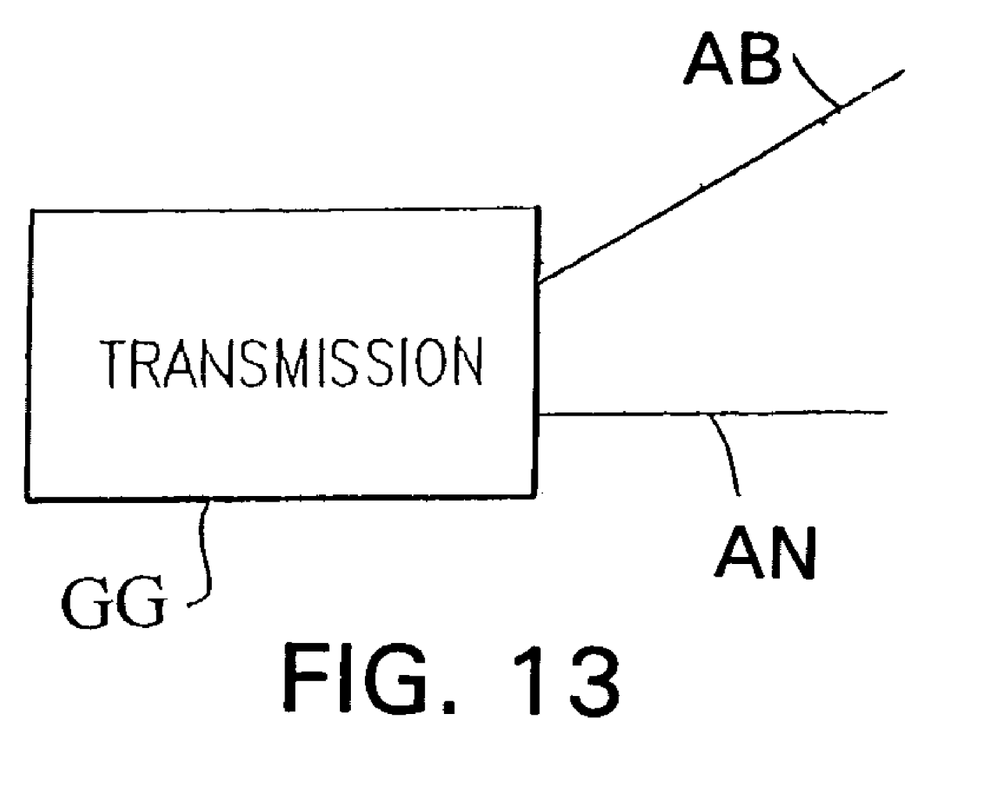
FIG. 13 is a diagrammatic view of another embodiment of the inventive multi-speed transmission with the input shaft at an angle to the output shaft.

In the embodiment example shown in FIG. 1, the first planetary gearset RS1 is the gearset proximal to the input-side and the third planetary gearset RS3 is the gearset proximal to the output-side of the transmission, whereby input shaft AN and output shaft AB, for example, are arranged to be coaxial to one another. It will be immediately evident to the expert, that this transmission, without special effort can be so modified, that input and output shafts need no longer be coaxial to one another, but for example, can now be axis parallel or angularly disposed in relation to one another, as shown in FIG. 13. In the case of an arrangement of this type, the expert, upon need, would place the input drive of the transmission near the third planetary gearset RS3, that is to say, on that side of the third planetary gearset RS3, which is remote from the first planetary gearset RS1.

Principally, it is possible that the spatial arrangement of the shifting elements of the embodiment shown in FIG. 1 of an inventive multi-speed transmission can be optionally within the transmission, and would only be limited by means of the overall dimensions and the outside shape of the transmission housing GG.

In the presentation given in FIG. 1 of an embodiment, the two brakes, A and B, when seen in relation to their occupying space, have been placed in the area of the first planetary gearset RS1, which is proximal to the input drive. When this is done, the said brakes are axially aligned and beside one another. The brakes A and B are in kinematic connection with the first planetary gearset RS1. The brake B is nearer to the fourth planetary gearset RS4, which in turn is adjacent the first planetary gearset RS1, than is the brake A, in other words, the brake A is placed nearer the input drive of the transmission than the brake B. Spatially observed, the brake B is placed partially in an area radially located above the first planetary gearset RS1 and the brake A is correspondingly on that side of the first planetary gearset RS1, which is remote from the fourth planetary gearset RS4 (that is to say, near the input drive). An inner disk carrier of the brake A forms a section of the shaft 3 of the transmission and is rotationally affixed to the sun gear SO1 of the first planetary gearset RS1, on that side thereof, which is remote from the fourth planetary gearset RS4. In a sectional way, the shaft 3 is designed as a type of sun shaft, which unites the sun gears SO1, SO4 of the planetary gearsets RS1, RS4. In this way, it is possible that the shaft 3 can be rotationally affixed on both the input shaft AN as well as on a (not shown in greater detail in FIG. 1) a housing fastened hub. An inner disk carrier of the brake B forms a section of the shaft 4 of the transmission and is rotationally affixed to the coupled carrier ST1 of the first planetary gearset RS1. The servoapparatuses which are necessary for the activation of the frictional elements of the two brakes A and B are not shown in greater detail in FIG. 1 and can, for example, be slidably and axially mounted in the transmission housing GG or integrated in a transmission housing affixed cover, that is to say, be placed in an axially slidable manner.

Upon need, the expert could modify this exemplary spatial arrangement of the two brakes A and B without any special inventive effort. In this way, it is possible that the brake A, for example, could be placed at least partially radially above the first planetary gearset RS1 and the brake B be located partially and radially above the fourth planetary gearset RS4. In still another arrangement, it is possible that the two brakes A and B could also be set radially above one another, thus axially bordering the first planetary gearset RS1 on that side thereof which is remote from the fourth planetary gearset RS4. In such a case, the brake B is then, for example, located at a greater diameter than is the brake A.

As may be further inferred from FIG. 1, all three clutches C, D, E, respective of spatial requirements, are at least partially in an area axially located between the fourth and second planetary gearsets RS4, RS2. The servoapparatus necessary for the activation of the corresponding disk packets C, D, E is not further described in detail for the sake of simplification of FIG. 1.

Directly and axially, the clutch C borders the fourth planetary gearset RS4. In this arrangement, an outer disk carrier of the clutch C, is rotationally affixed to the carrier ST4 of the fourth planetary gearset RS4 and to the input shaft AN on that side of the disk packet of the clutch C, which is proximal to the fourth planetary gearset RS4. On this account, the outer disk carrier of the clutch C can be regarded as a section of the shaft 1 of the transmission. An inner disk carrier of the clutch C is rotationally affixed to the sun gear SO3 of the third planetary gearset RS3 and therefore can also be regarded as a section of the shaft 5 of the transmission. The servoapparatus necessary for the activation of the disk packet of the clutch C can, for example, be placed within that cylindrical space, which is created by the outer disk carrier of the clutch C. This servoapparatus, can additionally be axially and slidably mounted on the outer disk carrier of the clutch C, whereby it would rotate thereafter continually at the same speed of rotation as the shaft 1, that is to say, the input shaft. For compensation of the centrifugal pressure of the rotating pressure chamber of the servoapparatus, it is possible that the clutch C, in a known manner, could possess a dynamic pressure compensation means.

As is further to be seen in FIG. 1, at least the disk set of the clutch E, with consideration given to its spatial conditions, is placed in an area located axially between the disk set of the clutch C and the disk set of the clutch D. An inner disk carrier of the clutch E is—as is also the case for the inner disk carrier of the clutch C—rotationally affixed with the sun gear SO3 of the third planetary gearset RS3, and on this account, can also be regarded as a section of the shaft 5 of the transmission. In this way, it is possible, that when producing the clutches C and E, advantageously a common disk carrier can be provided. An outer disk carrier of the clutch E is rotationally affixed with the ring gear HO4 on that side of clutch E which is proximal to the fourth planetary gearset RS4 and also is rotationally affixed to the sun gear SO2 of the second planetary gearset RS2 on that side of clutch E which is proximal to the second planetary gearset RS2, whereby it can be regarded as forming a section of the shaft 7 of the transmission. The servoapparatus necessary for the activation of the disk set of the clutch E can be axially and slidably mounted on the inner disk carrier of the clutch E, whereby it would rotate continually at the speed of rotation of the shaft 5. Alternately, however, the servoapparatus can be axially and slidably mounted on the outer disk carrier of the clutch E, whereby it would rotate continually at the speed of rotation of the shaft 7. Obviously, it is possible that the servoapparatus of the clutch E could have a dynamic pressure compensation means.

Deviating from the presented embodiment example in FIG. 1, it is possible that in another arrangement of the transmission, provision can be made, that the two clutches, namely C and E form a factory-side, preassembled component, which encompasses disk sets, which are radially stacked, one over the other, for the clutches C and E, as well as including a common disk carrier. Also provided therein are servoapparatuses for the activation of the respective disk sets of the clutches C and E, whereby the disk set of the clutch C is placed radially beneath the disk set of the clutch E, and whereby the common disk carrier for the (radially inner) clutch C is designed as an outer disk carrier and is designed for the (radial outer) clutch E as an inner disk carrier and is continually bound to the sun gear SO3 of the third planetary gearset RS3 to serve as a section of the shaft 5 of the transmission, and whereby both servoapparatuses are axially and slidably mounted on the common disk carrier.

As is to be further learned from FIG. 1, the disk set of the clutch D is at least placed in a neighboring position close to second planetary gearset RS2. In this arrangement, an inner disk carrier of the clutch D is rotationally affixed to the carrier ST2 of the second planetary gearset RS2, and on this account, also can be regarded as a section of the shaft 8 of the transmission. An outer disk carrier of the clutch D is rotationally affixed with the ring gears HO1, HO4 of the first and fourth planetary gearsets RS1, RS4 and on this account can be regarded as a section of the shaft 6 of the transmission. In this arrangement, the shaft 6 completely overlaps, in its axial length, the fourth planetary gearset RS4, the clutches C and E as well as the second planetary gearset RS2. The servoapparatus necessary for the activation of the disk set of the clutch D, advantageously, within the cylindrical space formed by the shaft 6, onto which the outer disk carrier of the clutch D is axially and slidably affixed, whereby it rotates continually at the speed of rotation of the shaft 6. A pressure chamber of this servo apparatus of the clutch D—and, if such be present, also a pressure compensation chamber for the compensation of the pressure developed by the turning of this rotational pressure chamber of the servoapparatus of the clutch D—in such a situation, for the realization of a simply designed pressure and lubrication feed system, can be spatially fitted into an area, which is axially placed between the first and the fourth planetary gearsets RS1, RS4, whereby, then, an activation device, which acts upon the disk set of the clutch D, overlaps, in an axial direction, the fourth planetary gearset RS4 as well as the two clutches C and D.

It is to be emphatically pointed out, that the above described arrangement of the three clutches C, D and E is to be regarded only as an example. Upon specific need, the expert can also modify this exemplary spatial arrangement of the three clutches C, D and E. A multitude of arrangements to this end can be inferred from the patent application DE 102005002337.1. Thus it is possible, again as an example—without essentially changing the construction shown in FIG. 1 of the therein presented transmission—that provision can be made, in that the disk packet of the clutch E, with spatial considerations, can be, at least partially, placed radially above the disk set of the clutch C, and that also the clutch E, again with spatial considerations, can be placed at least partially radially above the clutch C.

Figure 2:
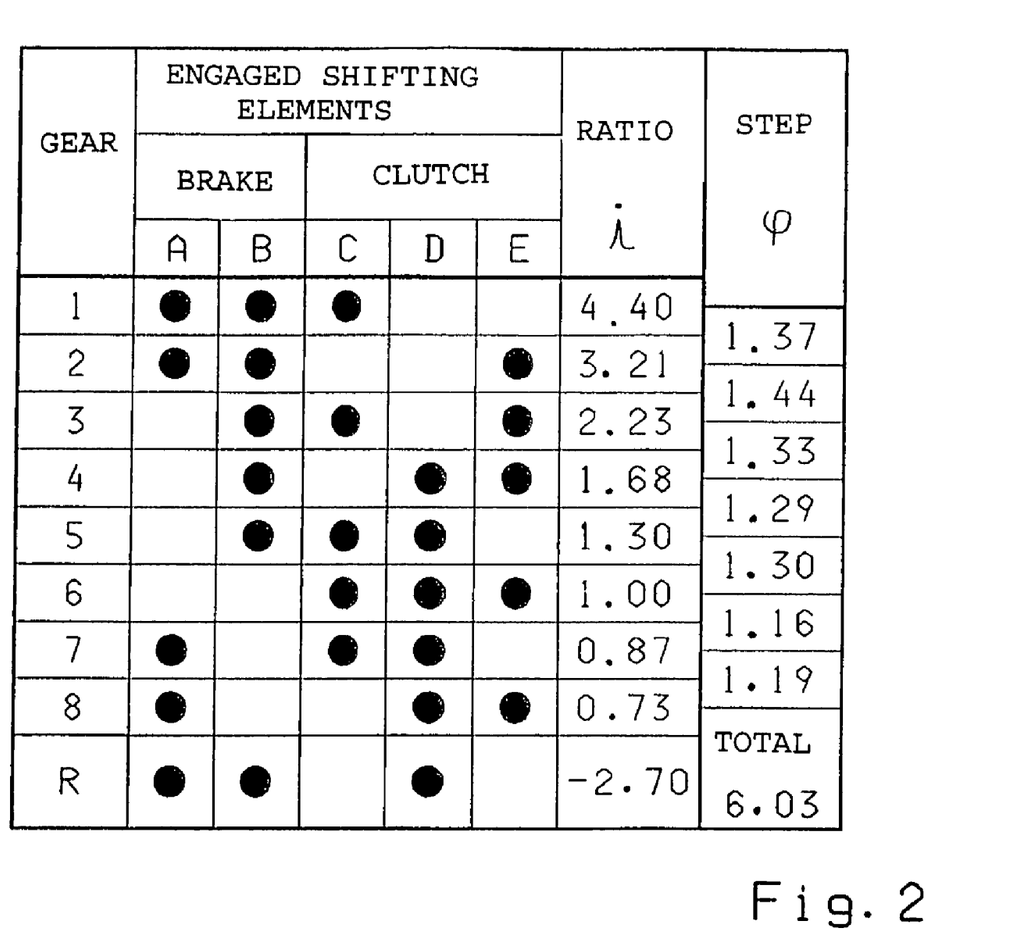
FIG. 2 an exemplary shifting diagram for the multi-speed transmission which is shown in FIG. 1.

In FIG. 2 is shown a shifting diagram of the inventive multi-speed transmission similar to FIG. 1. In each gear, three shifting elements are engaged, and two shifting elements are disengaged. Beside the shifting logic, it is possible to extract exemplary values for the specific ratios "i" of the individual gear stages and the inter-gear steps ϕ. The given ratios i are taken from the (typical) stationary transmission ratios of the four planetary gear seats, namely RS1, RS2, RS3, RS4, these being +3.50, −3.70, −3.40 and −2.70. Further, it is possible to infer from the shifting diagram that during sequential shifting methods the following procedures are avoided, namely, double shifting, or range shifting. This is due to the fact that in the shifting logic, neighboring gears employ two shifting elements in common. The sixth gear stage is designed as a direct gear.

The first forward gear is achieved by the engaging of the brakes A and B and the clutch C, the second forward gear by engaging the brakes A and B and the clutch E, the third forward gear by engaging the brake B and the clutches C and E, the fourth forward gear by engaging the brake B and the clutches D and E, the fifth forward gear by engaging the brake B and the clutches C and D, the sixth forward gear by engaging the clutches C, D and E, the seventh forward gear by engaging the brake A and the clutches C and D, and finally the eighth forward gear by engaging the brake A and the clutches D and E. As may be further gained from the shifting diagram, the reverse gear is obtained by engaging the brakes A and B and the clutch D.

In accord with the invention, an initiating drive of a motor vehicle is possible with a shifting element integrated in the transmission. In such a case, a shifting element, that is a necessary element in both forward travel as well as reverse travel is particularly suitable. Advantageously, these characteristics are present in the brake A or the brake B since these brakes are also required in the second forward gear. If the brake B is used as a startup element in the transmission, accordingly startup in the first five forward gears and in the reverse gear becomes possible. As may be seen in the shifting diagram it is possible to employ both the clutch C for forward travel and the clutch D for reverse travel, these clutches being used as transmission-integrated startup elements.

For the previously presented and described embodiment example of the multi-speed transmission, the following is of continuing value:

In accord with the invention, it is possible, even with the same shifting diagram, in accord with the stationary transmission ratios of the individual planetary gearsets, to have varying gear-to-gear steps, so that an application-specific, i.e., a vehicle-specific variation would be available.

Figure 8:
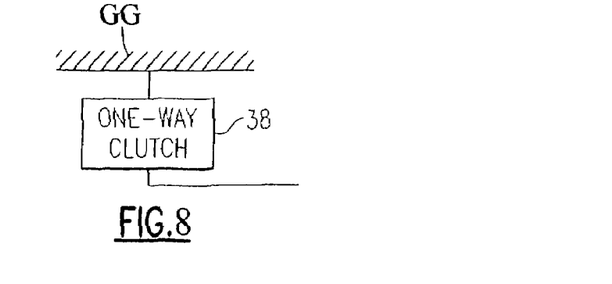
FIG. 8 is a diagrammatic view of an embodiment of the inventive multi-speed transmission having a one-way clutch.

It is additionally possible, at every characteristic position of a multi-speed transmission to provide a one-way clutch 38, for example, as is shown in FIG. 8, between a shaft and the housing or in order to connect two shafts.

Figure 3:
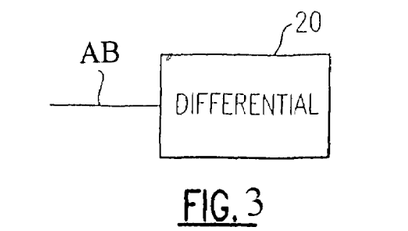
FIG. 3 is a diagrammatic view of an embodiment of the inventive multi-speed transmission having a differential.

On the input drive side or on the output drive side, an axle-differential 20 or a center-differential can be installed, as shown in FIG. 3.

Figure 4:
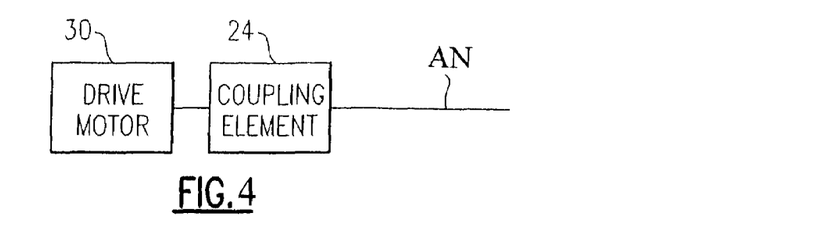
FIG. 4 is a diagrammatic view of an embodiment of the inventive multi-speed transmission with a coupling element and a drive motor.
Figure 5:
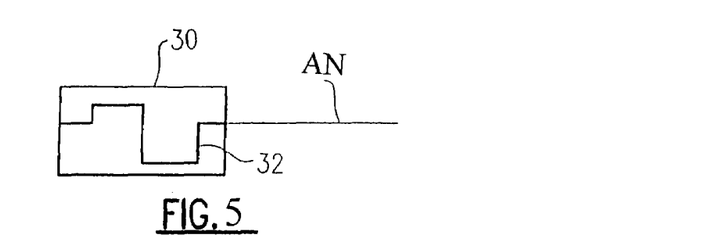
FIG. 5 is a diagrammatic view of an embodiment of the inventive multi-speed transmission with a crankshaft of the drive motor fixed to an input shaft of the multi-speed transmission.
Figure 12:
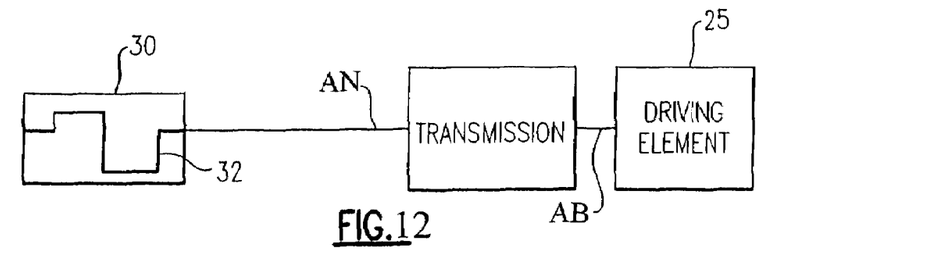
FIG. 12 is a diagrammatic view of another embodiment of the inventive multi-speed transmission with the crankshaft of the drive motor fixed to the input shaft of the multi-speed transmission and the coupling element located behind the multi-speed.

Within an advantageous development, as shown in FIG. 4, it is possible that the input shaft AN can be separated by a coupling element from a drive motor 30 under needful conditions, whereby, as such a coupling element a hydrodynamic converter, a hydraulic clutch, a dry startup clutch, a wet startup clutch, a magnetic-powder clutch or a centrifugal clutch can be applied. It is also possible, as shown in FIG. 12, to place a driving element 25 in the power flow behind the transmission, whereby, in such a case, the input shaft AN is continually bound to the crankshaft 32 of the drive motor 30, as shown in FIG. 5.

Figure 6:
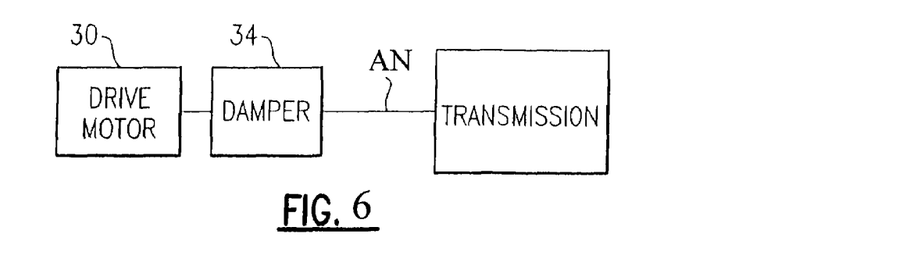
FIG. 6 is a diagrammatic view of an embodiment of the inventive multi-speed transmission having the drive motor communicating with a damper.

The multi-speed transmission also enables, as shown in FIG. 6, the placement of a torque-vibration damper 34 between the drive motor 30 and the transmission.

Figure 7:
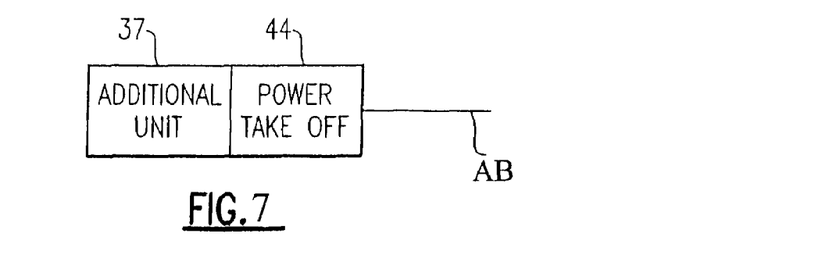
FIG. 7 is a diagrammatic view of an embodiment of the inventive multi-speed transmission with a power take-off for driving an additional unit.
Figure 10:
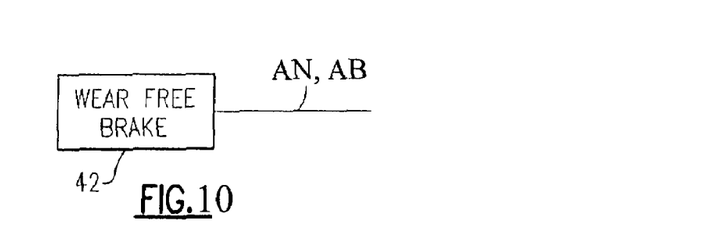
FIG. 10 is a diagrammatic view of a preferred design of the inventive multi-speed transmission having a wear free brake.
Figure 11:
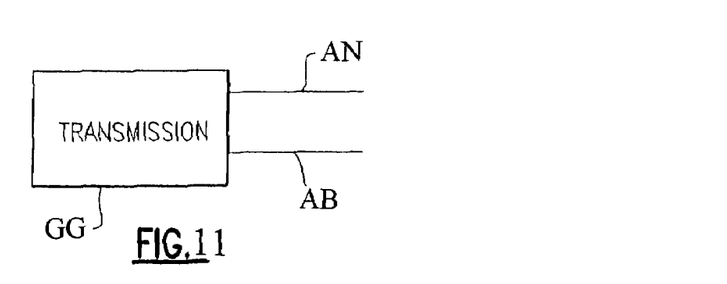
FIG. 11 is a diagrammatic view of a further embodiment of the invention with the input and the output being provided on the same side of the multi-speed transmission housing.

Within the limits of yet another development of the invention, shown in FIG. 10, it is possible to place on any shaft, preferably on the input shaft AN or on the output shaft AB, a wear-free brake 42 such as for example, a hydraulic or electric retarder or the like, which, especially for installation in commercial vehicles, can be of considerable importance. In addition, as shown in FIG. 7, it is possible that for the powering of additional units 37 on each shaft, preferably on the input shaft AN or on the output shaft AB, a power take-off 44 could be provided. Additionally, as shown in FIG. 11, the input and the output are provided on the same side of the housing GG.

The applied shifting elements can be designed as power shifting clutches or power shift brakes. Especially, friction-locking clutches or friction-locking brakes, such as, for instance, multi-disk clutches, band brakes and/or cone clutches, could be used. In addition it is possible that to serve as shifting elements, form-fit brakes and/or form-fit clutches, such as, for example, synchronization devices or claw clutches could be employed.

Figure 9:
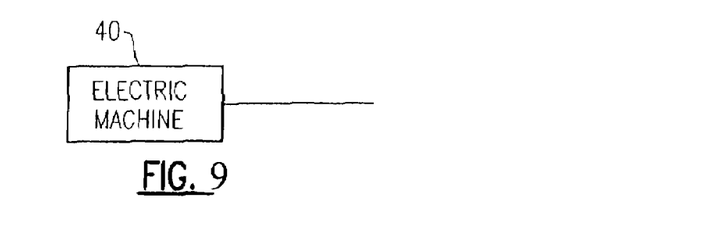
FIG. 9 is a diagrammatic view of an embodiment of the inventive multi-speed transmission with an electric machine.

An additional advantage of the presented multi-speed transmission of FIG. 9, is in that at each shaft an electrical machine 40 can be installed as a generator and/or as an additional drive unit.

Obviously, every improvement of design, for instance a spatial arrangement of the planetary sets and/or shifting elements, for themselves alone, or in combination therebetween, falls under the protective breadth of the present claims, as such protections are stated in the claims, without the influence of the function of a transmission, this being true even if the explanation thereof, or the depictions in the figures are not explicitly stated in the description.

REFERENCE NUMBERS AND
CORRESPONDING COMPONENTS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of first planetary gearset
SO1 sun gear of first planetary gearset
ST1 carrier of first planetary gearset
PL1a outer planet gears of the first planetary gearset
PL1i inner planet gears of the first planetary gearset
RS2 second planetary gearset
HO2 ring gear of the second planetary gearset SO2 sun gear of the second planetary gearset
ST2 carrier of the second planetary gearset
PL2 planet gears of the second planetary gearset
RS3 third planetary gearset
HO3 ring gear of the third planetary gearset
SO3 sun gear of the third planetary gearset
ST3 carrier of the third planetary gearset
PL3 planet gears of the third planetary gearset
RS4 fourth planetary gearset
HO4 ring gear of the fourth planetary gearset
SO4 sun gear of the fourth planetary gearset
ST4 carrier of the fourth planetary gearset
PL4 planet gears of the fourth planetary gearset
i gear ratio
φ spring, between gear steps

The invention claimed is:

1. A multi-speed automatic transmission of a planetary design for a motor vehicle, the transmission comprising:
an input shaft (AN);
an output shaft (AB);
first, second, third and fourth planetary gearsets (RS1, RS2, RS3, RS4), and each of the first, the second, the third and the fourth planetary gearsets (RS1, RS2, RS3, RS4) comprising a sun gear, a carrier and a ring gear;
at least first, second, third, fourth, fifth, sixth, seventh and eighth rotatable shafts (1, 2, 3, 4, 5, 6, 7, 8) and first, second, third, fourth and fifth shifting elements (A, B, C, D, E) whose selective engagement creates different gear ratios, between the input shaft (AN) and the output shaft (AB) so that eighth forward gears and at least one reverse gear can be implemented;
wherein the carrier (ST4) of the fourth planetary gearset (RS4) and the input drive shaft (AN) are permanently connected and form the first shaft (1);
the ring gear (HO2) of the second planetary gearset (RS2) and the carrier (ST3) of the third planetary gearset (RS3) and the output drive shaft (AB) are connected to one another and form the second shaft (2);
the sun gear (SO1) of the first planetary gearset (RS1) and the sun gear (SO4) of the fourth planetary gearset (RS4) are permanently connected and form the third shaft (3);
the carrier (ST1) of the first planetary gearset (RS1) forms the fourth shaft (4);
the sun gear (SO3) of the third planetary gearset (RS3) forms the fifth shaft (5);
the ring gear (HO1) of the first planetary gearset (RS1) and the ring gear (HO3) of the third planetary gear (RS3) are permanently connected and form the sixth shaft (6);
the sun gear (SO2) of the second planetary gearset (RS2) and the ring gear (HO4) of the fourth planetary gearset (RS4) are permanently connected and form the seventh shaft (7);
the carrier (ST2) of the second planetary gearset (RS2) forms the eighth shaft (8);
the first shifting element (A) is arranged between the third shaft (3) and a transmission housing (GG) of the transmission;
the second shifting element (B) is arranged between the fourth shaft (4) and the transmission housing (GG) of the transmission;
the third shifting element (C) is arranged, in a direction of power flow, between the first shaft (1) and the fifth shaft (5);
the fourth shifting element (D) is arranged, in the direction of power flow, between the sixth shaft (6) and the eighth shaft (8); and the fifth shifting element (E) is arranged, in the direction of power flow, between the fifth shaft (5) and the seventh shaft (7).

2. The multi-speed transmission according to claim 1, wherein:
a first forward gear is achieved by engagement of the first shifting element (A), the second shifting element (B) and the third shifting element (C);
a second forward gear is achieved by engagement of the first shifting element (A), the second shifting element (B), and the fifth shifting element (E);
a third forward gear is achieved by engagement of the second shifting element (B), the third shifting element (C) and the fifth shifting element (E);
a fourth forward gear is achieved by engagement of the second shifting element (B), the fourth shifting element (D) and the fifth shifting element (E);
a fifth forward gear is achieved by engagement of the second shifting element (B), the third shifting element (C) and the fourth shifting element (D);
a sixth forward gear is achieved by engagement of the third shifting element (C) the fourth shifting element (D) and the fifth shifting element (E);
a seventh forward gear is achieved by engagement of the first shifting element (A), the third shifting element (C) and the fourth shifting element (D);
a eighth forward gear is achieved by engagement of the first shifting element (A), the fourth shifting element (D) and the fifth shifting element (E); and
a reverse gear is achieved by engagement of the first shifting element (A), the second shifting element (B) and the fourth shifting element (D).

3. The multistage transmission in accordance with claim 1, wherein the second planetary gearset (RS2), the third planetary gearset (RS3) and the fourth planetary gearset (RS4) are all negative planetary gearsets, and the first planetary gearset (RS1) is a positive planetary gearset.

4. The multistage transmission in accordance with claim 1, wherein the first planetary gearset (RS1), the second planetary gearset (RS2), the third planetary gearset (RS3) and the fourth planetary gearset (RS4) are co-axial and arranged, in an axial direction, in a sequential order of:
the first planetary gearset (RS1), the fourth planetary gearset (RS4), the second planetary gearset (RS2), and the third planetary gearset (RS3).

5. The multistage transmission in accordance with claim 1, wherein the input shaft (AN) is one of axially parallel and at an angle to the output shaft (AB), and one of the first planetary gearset (RS1) and the third planetary gearset (RS3) is located on a side of the transmission housing (GG) closest to a drive motor which is connected to the input shaft (AN) of the transmission.

6. The multistage transmission in accordance with claim 1, wherein the input shaft (AN) is co-axial with the output shaft (AB), and the first planetary gearset (RS1) is located on a side of the transmission housing (GG) closest a drive motor which is connected to the input shaft (AN).

7. The multistage transmission in accordance with claim 1, wherein each of the first planetary gearset (RS1), the second planetary gearset (RS2), the third planetary gearset (RS3) and the fourth planetary gearset (RS4) are respectively radially centrally passed through in an axial direction, by a maximum of one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8).

8. The multistage transmission in accordance with claim 1, wherein the first planetary gearset (RS1) and the fourth planetary gearset (RS4) are centrally passed through, in an axial direction, by only the first shaft (1) and the second planetary gearset (RS2) is centrally passed through, in the axial direction, by only the fifth shaft (5).

9. The multistage transmission in accordance with claim 1, wherein neither the first planetary gearset (RS1) and the fourth planetary gearset (RS4) is centrally passed through by any of the output shaft (AB), the second shaft (2), the fourth shaft (4), the fifth shaft (5), the sixth shaft (6), the seventh shaft (7) and the eighth shaft (8), and when the first shaft (1) is coupled to the fifth shaft (5), the second planetary gearset (RS2) is axially, centrally passed through by both the fifth shaft (5) and the first shaft (1).

10. The multistage transmission in accordance with claim 1, wherein the third shaft (3) is rotatably connected to a hub which is connectable to the transmission housing (GG).

11. The multistage transmission in accordance with claim 1, wherein at least one of the first shifting element (A) and the second shifting element (B) is radially located at least partially above one of the first planetary gearset (RS1) and the fourth planetary gearset (RS4).

12. The multistage transmission in accordance with claim 1, wherein the first shifting element (A) is adjacent the second shifting element (B) and at least one friction element of the second shifting element (B) is located closer to the fourth planetary gearset (RS4) than a friction element of the first shifting element (A).

13. The multistage transmission in accordance with claim 1, wherein one of the first shifting element (A) is radially located above the second shifting element (B) and the second shifting element (B) is radially located above the first shifting element (A).

14. The multistage transmission in accordance with claim 1, wherein the third shifting element (C) is axially located at least partially between the fourth planetary gearset (RS4) and the second planetary gearset (RS2).

15. The multistage transmission in accordance with claim 1, wherein the third shifting element (C) is directly axially adjacent the fourth planetary gearset (RS4).

16. The multistage transmission in accordance with claim 1, wherein the fourth shifting element (D) is axially located at least partially between the fourth planetary gearset (RS4) and the second planetary gearset (RS2).

17. The multistage transmission in accordance with claim 1, wherein a disk set of the fourth shifting element (D) is axially adjacent the second planetary gearset (RS2).

18. The multistage transmission in accordance with claim 1, wherein the fifth shifting element (E) is axially located at least partially between the fourth planetary gearset (RS4) and the second planetary gearset (RS2).

19. The multistage transmission in accordance with claim 1, wherein the fifth shifting element (E) is axially located at least partially between the third shifting element (C) and the fourth shifting element (D).

20. The multistage transmission in accordance with claim 1, wherein a disk set of the fifth shifting element (E) is radially located at least partially above a disk set of the third shifting element (C).

21. The multistage transmission in accordance with claim 1, wherein the third shifting element (C) and the fifth shifting element (E) have a common disk carrier which is fixed to the sun gear (SO3) of the third planetary gearset (RS3).

22. The multistage transmission in accordance with claim 1, wherein the sixth shaft (6) completely overlies, in an axial direction, the fourth planetary gearset (RS4), the second planetary gearset (RS2), the third shifting element (C), and the fifth shifting element (E).

23. The multistage transmission in accordance with claim 1, wherein at least one one-way clutch is located between at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) and the transmission housing (GG).

24. The multistage transmission in accordance with claim 1, wherein the input shaft (AN) and the output shaft (AB) of the transmission are provided on opposite sides of the transmission housing (GG).

25. The multistage transmission in accordance with claim 1, wherein the input shaft (AN) and the output shaft (AB) of the transmission are located on a common side of the transmission housing (GG).

26. The multistage transmission in accordance with claim 1, wherein at least one of an axle differential and a distributor differential is located on one of the input shaft (1) and the output shaft (2).

27. The multistage transmission in accordance with claim 1, wherein a coupling element is located, in the direction of the power flow, between a drive motor and the input shaft (AN).

28. The multistage transmission in accordance with claim 27, the coupling element is one of a hydrodynamic converter, a hydraulic clutch, a dry startup clutch, a wet startup clutch, a magnetic power clutch or a centrifugal clutch can be provided.

29. The multistage transmission in accordance with claim 1, wherein the vehicle is started via one of the first shifting element (A), the second shifting element (B), the third shifting element (C) and the fourth shifting element (D), and the input shaft (AN) is permanently connected to a crankshaft of a drive motor in one of a rotationally fixed manner and a rotationally elastic manner.

30. The multistage transmission in accordance with claim 29, wherein the vehicle is started, in at least one of a forward direction and a reverse direction, via one of the first shifting element (A) and the second shifting element (B).

31. The multistage transmission in accordance with claim 1, wherein one of a wear free brake, a power take-off for driving additional units, an electric machine is fixed to at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) of the transmission, and the electric machine is at least one of a generator and an additional drive unit.

32. The multistage transmission in accordance with claim 1, wherein each of the first shifting element (A), the second shifting element (B), the third shifting element (C), the fourth shifting element (D) and the fifth shifting element (E) is one of a friction-locking clutch, a friction-locking brake, a disc clutch, a band brake and a conical clutch, a form-fit clutch, a form-fit brake, a conical clutch and a claw clutch.

* * * * *